United States Patent [19]
Choi

[11] Patent Number: 6,085,140
[45] Date of Patent: Jul. 4, 2000

[54] SHIFT CONTROL METHOD AND SYSTEM FOR AN AUTOMATIC TRANSMISSION

[75] Inventor: Youngsam Choi, Kyunggi-do, Rep. of Korea

[73] Assignee: Hyundai Motor Company, Seoul, Rep. of Korea

[21] Appl. No.: 08/986,143

[22] Filed: Dec. 5, 1997

[51] Int. Cl.[7] .............................. G06F 7/00; G06F 17/00; G06F 19/00
[52] U.S. Cl. ................... 701/55; 701/51; 701/95; 477/107; 477/115; 477/125
[58] Field of Search .................. 701/51, 52, 53, 701/54, 55, 62, 66, 79, 95; 477/107, 109, 115, 120, 81, 144, 125, 148, 154, 131, 156, 138

[56] References Cited

U.S. PATENT DOCUMENTS

| | | | |
|---|---|---|---|
| 4,970,916 | 11/1990 | Narita | 477/131 |
| 5,031,100 | 7/1991 | Takahashi | 701/55 |
| 5,393,275 | 2/1995 | Okada et al. | 477/81 |
| 5,415,056 | 5/1995 | Tabata et al. | 74/335 |
| 5,501,642 | 3/1996 | Inuzuka et al. | 477/107 |
| 5,527,236 | 6/1996 | Kimura et al. | 477/131 |

*Primary Examiner*—William A. Cuchlinski, Jr.
*Assistant Examiner*—Gertrude Arthur
*Attorney, Agent, or Firm*—Birch, Stewart, Kolasch & Birch, LLP

[57] ABSTRACT

Disclosed is a shift control method for an automatic transmission, including the steps of; detecting a present vehicle speed, determining whether a present shift stage is lower than a predetermined shift stage, and measuring a change of throttle opening degree when an accelerator pedal is released; determining whether the change is realized in less than a predetermined amount of time when the present shift stage is determined to be lower than the predetermined shift stage, thereby determining whether the throttle opening is abruptly changed; and performing a skip upshift operation by more than two stages when the throttle opening is determined to be abruptly changed. Further, disclosed is a shift control system for realizing the above method.

15 Claims, 3 Drawing Sheets

SHIFT CONTROL METHOD AND SYSTEM FOR AN AUTOMATIC TRANSMISSION

FIELD OF THE INVENTION

The present invention relates to an automatic transmission, in particular, a shift control method and system for an automatic transmission, which can reduce shift shock.

BACKGROUND OF THE INVENTION

Generally, in an automatic transmission, a transmission control unit (TCU) compares vehicle speed appearing as rotative speed of an output driven gear to an opening degree of a throttle indexed by the accelerator pedal and selects a suitable shift stage reflecting the vehicle speed and the throttle opening degree.

Further, when the vehicle is driving at a certain shift stage, if an automatic shift control system receives a signal that the accelerator pedal is released, in order to prevent shift shock caused by a sudden close of the throttle, the automatic shift control system synchronizes the automatic transmission to a higher shift stage than the present shift stage to maintain the vehicle speed and prevent shift shock.

In a conventional automatic transmission, if the signal that the accelerator pedal is released inputs to the shift control system at a certain shift stage driving state, the shift control system compares data corresponding to the throttle opening degree and the present vehicle speed with a preset data in a program.

Thereafter, the shift control system confirms whether the data is within the range of preset data corresponding to an objective shift stage predetermined for upshifting to a higher shift stage. If the data is within such a range, the shift control system proceeds with a predetermined shift process by control of a duty ratio for synchronization of a corresponding higher shift stage.

In the above conventional automatic transmission, if the throttle opening degree is rapidly changed, as shown in FIG. 3, the shift pattern to a higher shift stage is continuous such as I stage II stage III stage or II stage III stage IV stage such that it generates multi-shift shocks and, accordingly, shift quality is reduced. Further, the multi-shift causes a reduction in the lubricant's viscosity by repetitive operation of the operative parts and reduces durability of the hydraulic lines by frequent changes of the line pressure.

SUMMARY OF THE INVENTION

The present invention has been made in an effort to solve the above problems.

It is an object of the present invention to provide a shift control system and method which can reduce shift shock by substituting a skip upshift for multi-shift when a throttle opening is determined to be abruptly changed.

Such skip upshift prevents repetitive operation of operative parts in the automatic transmission and improves durability of the automatic transmission.

To achieve the above object, the present invention provides a shift control method for an automatic transmission, comprising the steps of:

detecting a present vehicle speed, determining whether a present shift stage is lower than a predetermined shift stage, and measuring a change of throttle opening degree when an accelerator pedal is released;

determining whether the change is realized in less than a predetermined amount of time when the present shift stage is determined to be lower than the predetermined shift stage, thereby determining whether the throttle opening is abruptly changed; and performing a skip upshift operation by more than two stages when the throttle opening is determined to be abruptly changed.

Further, the present invention provides a shift control system for an automatic transmission, comprising:

vehicle condition detecting means for detecting a present vehicle condition such as shift stage, throttle opening degree and vehicle speed;

a timer for measuring an amount of time during which the throttle opening degree is changed, when the vehicle condition detecting means detects a change of the throttle opening degree; control means for controlling overall shift operations such as upshift and downshift processes according to signals from said vehicle condition detecting means and said timer; and driving means for driving each operative part in the automatic transmission according to control signals from said control means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Preferred embodiments of the present invention will now be described in detail with reference to the accompanying drawings.

Figure 1:
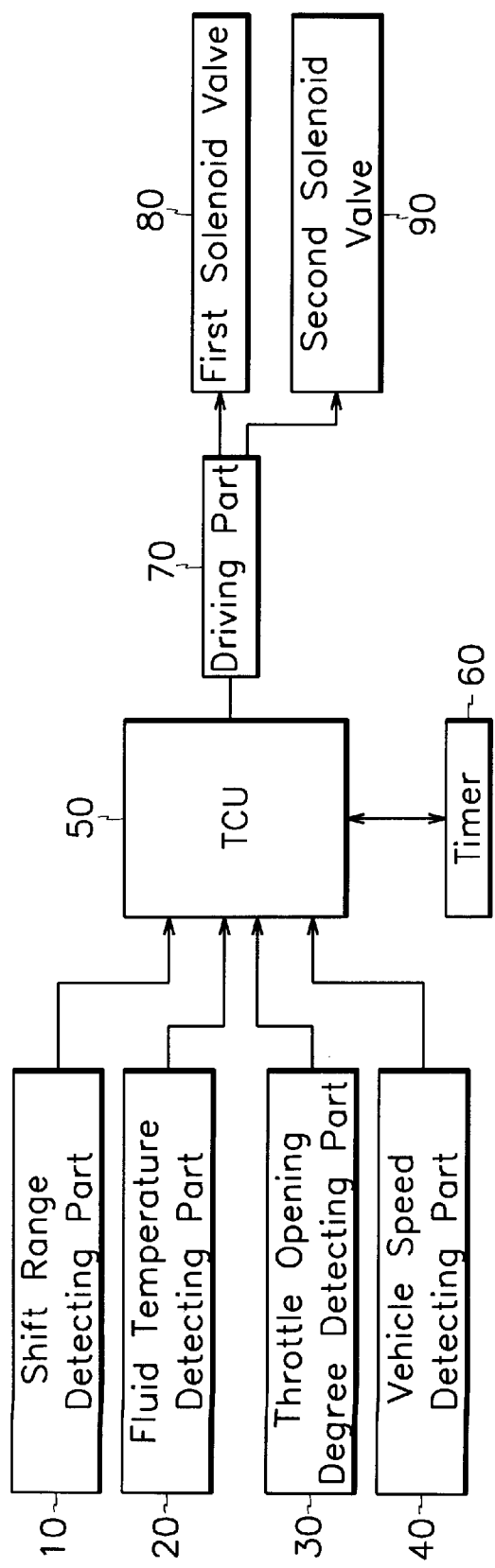
FIG. 1 is a block diagram showing a structure of a shift control system in accordance with a preferred embodiment of the present invention.

As shown in FIG. 1, the shift control system in accordance with a preferred embodiment of the present invention comprises a shift range detecting part 10, a fluid temperature detecting part 20, a throttle opening degree detecting part 30, a vehicle speed detecting part 40, a transmission control unit (TCU) 50, a timer 60, a driving part 70, a first solenoid valve 80 and a second solenoid valve 90.

The shift range detecting part 10 outputs a signal corresponding to a position where a selector lever was selected by the driver. The fluid temperature detecting part 20 detects the temperature of the fluid used in the automatic transmission and outputs a signal corresponding to a value of the temperature. The throttle opening degree detecting part 30 detects the opening degree of the throttle indexed by the accelerator pedal and outputs a signal corresponding to the same. The vehicle speed detecting part 40 detects the rotative speed of an output driven gear connected to the driving wheels and outputs a signal corresponding to the same.

The TCU 50 analyzes signals from each detecting parts and controls the overall shift operations of the automatic transmission such as upshift and downshift processes. Further, if a signal is detected that the opening degree of the throttle abruptly increases or decreases, the TCU 50 controls a duty ratio for engaging a skip shift upward of two stages.

If a signal which the accelerator pedal is released is inputted to the TCU, a timer 60 is reset to start counting seconds by a directive signals from the TCU and inputs a counting signal to the TCU.

The driving part 70 generates line pressure for actuating each clutch and brake in order to synchronize the automatic transmission to an objective shift stage in accordance with a directive signal transmitted from the TCU.

The first and second solenoid valves 80 and 90 regulate and maintain hydraulic pressure in each line for shift operating by suitably having each valve open and close in accordance with a signal from the driving part.

Figure 2:
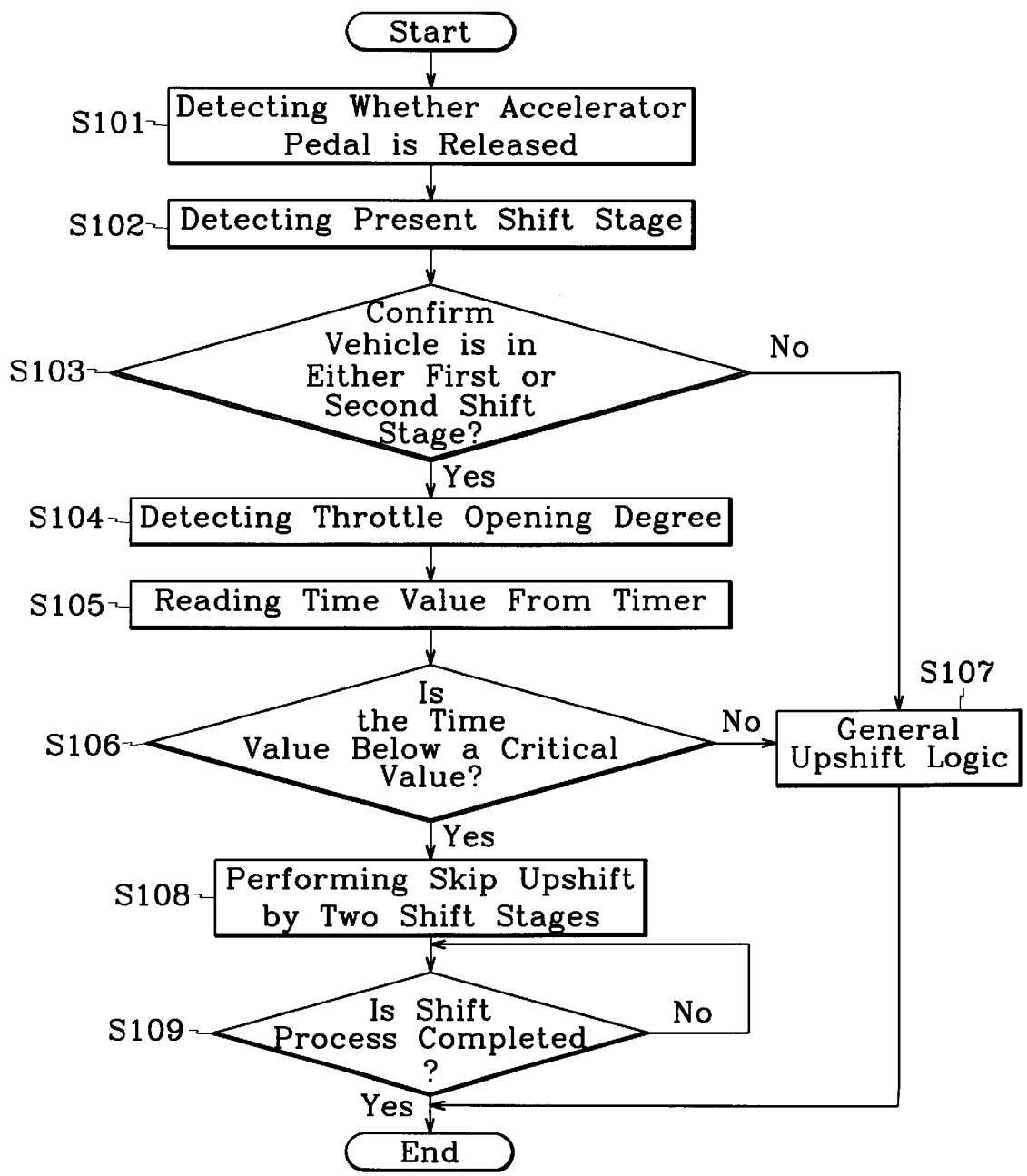
FIG. 2 is a flowchart showing an operating process of upshift control when an accelerator pedal is released, in the shift control system of FIG. 1.
Figure 3:
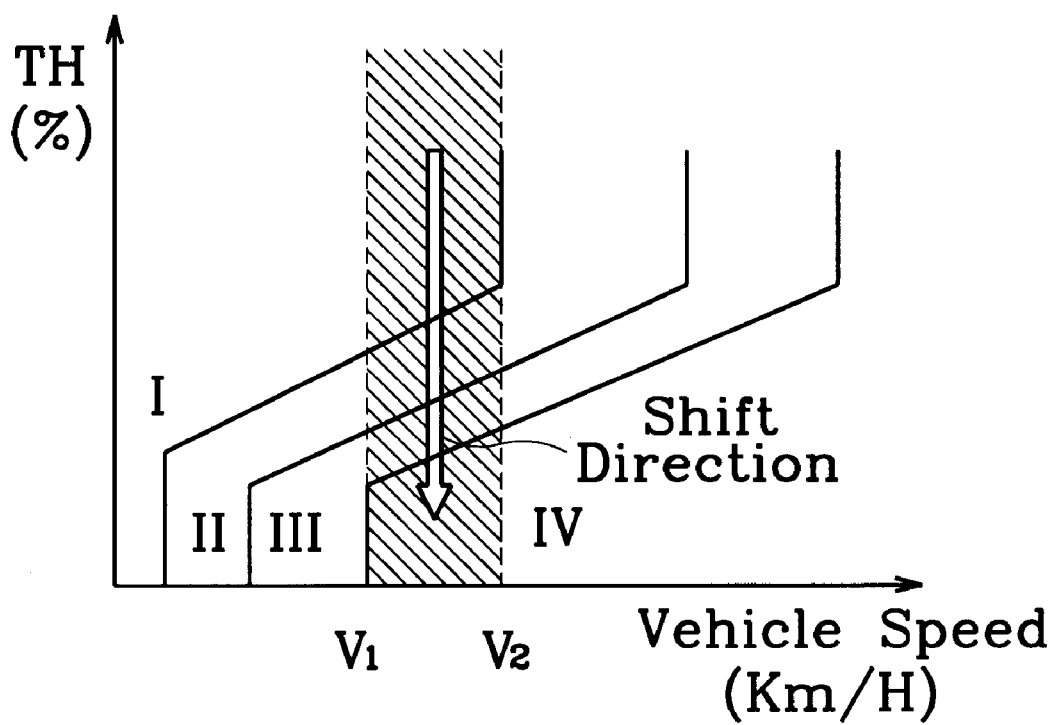
FIG. 3 is a view showing a general shift pattern.

In the shift control system structured as above, a shift control method and process will now be described with reference to a flowchart of FIG. 2.

When the vehicle is driving at a certain shift stage selected according to signals from the shift range detecting part 10, the throttle opening degree detecting part 30 and the vehicle speed detecting part 40, if a signal which the accelerator pedal is released is transmitted from the throttle opening degree detecting part to the TCU (step 101), the TCU transmits a reset signal to the timer 60 such that the timer starts counting.

Thereafter, the TCU 50 analyzes signals from the vehicle speed detecting part 40 to detect the present shift stage (step 102) and estimates whether the present vehicle speed is in the range of the first shift stage or second shift stage (step 103).

In step 103, if the present shift stage is estimated not at the first or second stage but the third or fourth shift stage, the TCU 50 carries out general upshift logic to synchronize the transmission from the present shift stage to the above shift stage (step 107).

In step 103, if the present shift stage is estimated at the first or second stage, the TCU detects a change rate of the throttle opening degree by a signal from the throttle opening degree detecting part 30 (step 104) and analyzes the time during which the timer is counting (step 105).

After step 105, the TCU estimates whether the change rate of the throttle opening degree is over a critical rate through the time during which the timer 60 proceed counting (step 106).

In step 106, if the change rate of the throttle opening degree is estimated slack, the process proceeds to step 107 to carry out general upshift logic. If the change rate of the throttle opening degree is estimated extreme, the TCU 50 sets the objective shift stage to a skip upshift, two or more shift stages higher than the present shift stage and initiates shift operation through the driving part 70, the first and second solenoid valves 80 and 90 (step 108).

Thereafter, the TCU 50 analyzes signals from each clutch and brake to estimate whether shift synchronization is accomplished (step 109). If this process is completed, the TCU terminates the upshift process.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A shift control method for an automatic transmission, comprising the steps of:

detecting a present vehicle speed, determining whether a present shift stage is lower than a predetermined shift stage, and measuring a change of throttle opening degree when an accelerator pedal is released;

determining whether the change is realized in less than a predetermined amount of time when the present shift stage is determined to be lower than the predetermined shift stage, thereby determining whether the throttle opening is abruptly changed; and performing a skip upshift operation by more than two stages when the throttle opening is determined to be abruptly changed.

2. A shift control method for an automatic transmission, comprising the steps of:

(a) detecting a present vehicle speed and a present shift stage, and reading a signal regarding an accelerator pedal;

(b) determining if the accelerator pedal is released;

(c) determining if the present shift stage is first or second shift stage;

(d) detecting if a throttle opening is changed when the condition of step (c) is satisfied;

(e) measuring an amount of time during which the throttle opening degree is changed;

(f) determining that the amount of time is below a predetermined amount of time; and (g) performing a skip upshift by two shift stages when the condition of step (f) is satisfied.

3. The shift control method according to claim 2, wherein a general upshift logic is carried out when the condition of step (c) is not satisfied.

4. The shift control method according to claim 2, wherein a general upshift logic is carried out when the condition of step (f) is not satisfied.

5. A shift control system for an automatic transmission, comprising:

vehicle condition detecting means for detecting a present vehicle condition such as shift stage, throttle opening degree and vehicle speed;

a timer for measuring an amount of time during which the throttle opening degree is changed, when the vehicle condition detecting means detects a change of the throttle opening degree;

control means for controlling overall shift operations such as upshift and downshift processes according to signals from said vehicle condition detecting means and said timer; and driving means for driving each operative part in the automatic transmission according to control signals from said control means.

6. The shift control system of claim 5, wherein said vehicle condition detecting means comprises:

shift range detecting means for outputting a signal corresponding to a shift range;

throttle opening degree detecting means for detecting the opening degree of the throttle indexed by the accelerator pedal and outputting a signal corresponding to the detected opening degree; and vehicle speed detecting means for detecting a vehicle speed and outputting a signal corresponding to the detected vehicle speed.

7. A shift control method for an automatic transmission, comprising the steps of:

(a) determining whether a present shift stage is lower than a predetermined shift stage;

(b) detecting over time at least one vehicle operating condition correlated to throttle opening;

(c) determining whether the throttle opening is abruptly changed based on the detected vehicle operating condition; and (d) performing a skip upshift operation by more than two stages when the throttle opening is determined to be abruptly changed and the present shift stage is determined to be lower than a predetermined shift stage.

8. The method of claim 7, wherein the predetermined shift stage is the highest or second-highest shift stage.

9. The method of claim 7, wherein the vehicle operating condition is position of an accelerator pedal.

10. The method of claim 7, wherein the vehicle operating condition is vehicle speed.

11. The method of claim 7, wherein the determining whether the throttle opening is abruptly changed step comprises:

monitoring a change rate in the vehicle operating condition over time;

comparing the monitored change rate and a predetermined change rate in the vehicle operating condition over time; and determining an abrupt change in the throttle opening if the monitored change rate exceeds the predetermined change rate.

12. An automatic transmission, comprising:

at least one sensor detecting at least one vehicle operating condition correlated to throttle opening;

a controller determining whether the throttle opening is abruptly changed based on the detected vehicle operating condition and controlling the automatic transmission to perform a skip upshift operation by more than two stages when the throttle opening is determined to be abruptly changed.

13. The automatic transmission of claim 12 wherein the vehicle operating condition is position of an accelerator pedal.

14. The automatic transmission of claim 12 wherein the vehicle operating condition is vehicle speed.

15. The automatic transmission of claim 12 wherein the controller determines whether the throttle opening is abruptly changed by monitoring a change rate in the vehicle operating condition over time, comparing the monitored change rate and a predetermined change rate in the vehicle operating condition over time and determining an abrupt change in the throttle opening if the monitored change rate exceeds the predetermined change rate.

* * * * *